United States Patent

[11] 3,593,212

[72] Inventor Robert E. Lindemann
St. James, N.Y.

[21] Appl. No. 815,741
[22] Filed Apr. 14, 1969
[45] Patented July 13, 1971
[73] Assignee Digital Devices, Inc.
Syosset, L. I., N.Y.

[54] TEMPERATURE-COMPENSATED DELAY LINE
9 Claims, 4 Drawing Figs.

[52] U.S. Cl. 333/30, 310/4 (.1)
[51] Int. Cl. H03h 9/30
[50] Field of Search 333/17, 30, 30 M; 340/10

[56] References Cited

UNITED STATES PATENTS

| | | | |
|---|---|---|---|
| 2,982,925 | 5/1961 | Barrow et al. | 333/30 M |
| 3,011,136 | 11/1961 | Scarrott | 333/30 |
| 2,863,120 | 12/1958 | Powell | 332/9 |
| 3,024,428 | 3/1962 | Warman | 333/17 |
| 3,475,705 | 10/1969 | Lindemann | 333/30 |
| 3,241,090 | 3/1966 | Bastian | 333/30 M |

*Primary Examiner*—Herman Karl Saalbach
*Assistant Examiner*—C. Baraff
*Attorney*—Nicholas A. Pandiscio

ABSTRACT: A temperature-compensated delay line wherein one of the input and output transducers thereof is movable, and including means for moving the transducer according to changes in ambient temperature to maintain the time delay at a predetermined value.

PATENTED JUL 1 3 1971 3,593,212

ROBERT E. LINDEMANN
INVENTOR.

BY

Nicholas A. Pandiscio

ATTORNEY

TEMPERATURE-COMPENSATED DELAY LINE

This invention relates to electroacoustic delay lines for providing a time delay between input and output electric signals and more particularly to delay lines of the type employing magnetostrictive excitation to provide a torsional acoustic stress wave in a wire line.

Delay lines of the general character contemplated by this invention are well known in the art, as exemplified by U.S. Pat. No. 3,241,090 issued Mar. 15, 1966, to A. L. Bastian and U.S. Pat. No. 3,011,136, issued Nov. 28, 1961, to Gordon George Scarrot. Essentially such lines comprise an elongated conductor of acoustic stress waves in the form of a wire, an input transducer adapted to set up stress waves in the wire in response to input electrical signals, and an output transducer adapted to receive the stress waves and generate output signals in response thereto. The mechanical stress waves propagate in the wire at an ultrasonic velocity characteristic of the particular material of which the wire is composed. The delay provided by the line is equivalent to the time separation between corresponding input and output signals and is a function of the delay line composition and the length of the line between the input and output transducers. The term "electrical signal" is intended to include pulses or any waveform having a leading or trailing edge abrupt enough to mark an instant of time. The term "wire" is understood to be a wire, filament, rod, tube and the like.

Acoustic delay lines are useful for a number of purposes, notably for handling digital information in computer systems. In many circuit applications, it is essential that the delay tine be accurate and constant. However, the characteristic propagation velocity and the length of the delay line are affected to some extent by temperature, with the result that the delay time of a line is temperature sensitive. Depending upon the temperature coefficient of delay, the time delay of a given line may vary enough with temperature to render it unsuitable for certain high accuracy applications, particularly for airborne equipment. Accordingly efforts have been made in the past to provide delay lines with ambient temperature compensation. The favored approach is to provide temperature responsive means adapted to vary the effective acoustic separation of the input and output transducers in a direction and amount necessary to achieve the desired compensation. However, the temperature effect may be a complex function and the thermal coefficient tends usually to be of a parabolic form with the apex of the parabola in the vicinity of room temperature, i.e., 20°—25° C. Accordingly for most high accuracy applications it is necessary to compensate the temperature effect over a range extending both above and below room temperature in order to maintain a constant time delay. Prior attempts to compensate for temperature have not been fully satisfactory. In some cases only limited temperature compensation has been achieved, e.g. compensation to one side or the other of the apex of the parabolic thermal coefficient curve according to a function not sufficiently similar to that of the temperature coefficient to achieve a substantially constant delay time over the operating temperature range. In other cases, the temperature responsive means have not been reliable or have been difficult to adjust, fabricate or assemble. A further problem has been difficulty in zeroing the transducers, i.e. initially adjusting the position of the transducers to achieve a prescribed delay time at room or other selected temperature.

Accordingly the primary object of this invention is to provide a delay line which offers a substantially constant time delay over a relatively wide range of temperatures.

A further object is to provide a temperature-compensated delay line which is substantially free of the difficulties noted above and to achieve the same in a simple, economical and reliable manner.

Essentially these and other objects hereinafter disclosed or rendered obvious are achieved by providing temperature compensating means comprising a pair of bimetallic arms mounted in a dual cantilever arrangement, with one arm attached to a shaft on which is supported one of the input and output transducers. The arms are mounted with their low expansion sides confronting one another and means are provided whereby the position of the shaft is affected by bending movement of one arm or the other, depending upon whether the temperature increases or decreases relative to room temperature. A change in temperature will cause the arms to bend according to the direction and amount of the change in temperature, and such bending in turn effects a change in position of the transducer by an amount that will maintain the time delay at a constant value. The shaft also is provided with a vernier adjustment enabling precise positioning of the transducer with respect to the delay line.

Other features and many of the attendant advantages of the invention are described or rendered obvious in the following detailed description of a preferred embodiment of the invention which is to be considered together with the accompanying drawing wherein.

Figure 1:
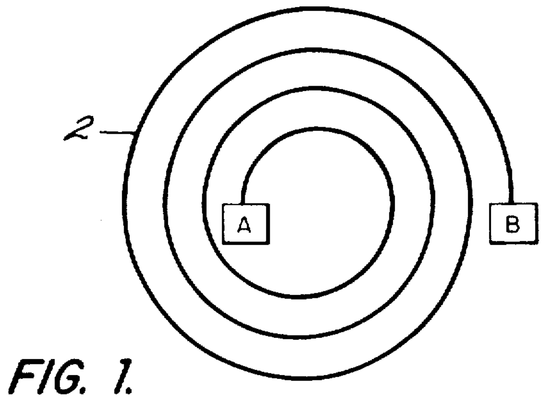
FIG. 1 is a schematic plan view of a helical delay line embodying the present invention.
Figure 3:
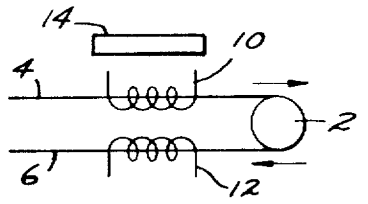
FIG. 3 is a simplified diagram of an input or output torsional stress-wave transducer of the type used in the delay line of FIG. 1; an FIG. 4 is a set of curves of use in explaining the purpose and mode of operation of the invention.

Turning now to FIG. 1, the preferred embodiment of the invention is an electroacoustic delay line comprising a length of wire 2 of uniform diameter made of an alloy capable of low-loss propagation of torsional stress waves and wound in a flat spiral. By way of example, the wire may be made of Ni-Span C or a nickel-iron-titanium alloy. Associated with wire 2 are input and output torsional stress wave transducers A and B respectively. As shown in FIG. 3, the input transducer A consists of two elongated members of magnetostrictive material in the form of nickel tapes 4 and 6 which are welded to diametrically opposite areas of the surface of wire 2 and extend tangentially from the areas of contact. The tapes 4 and 6 are disposed so that the centers of the areas of contact with the wire 2 lie in a common plane extending at a right angle to the axis of the wire. The input transducer A includes electromagnetic means for setting up longitudinal stress waves in the tapes 4 and 6, such means consisting of like coils 10 and 12 surrounding the two tapes. The coils are located at equal distances from the tapes and are connected for simultaneous pulse-energization. When the coils 10 and 12 are energized, the tapes are affected in known magnetostrictive manner so that longitudinal stress waves are set up therein. Since the two tapes extend in the same direction, it is necessary that the longitudinal stress wave set up by energization of one coil be of opposite sense to the stress wave set up by energization of the other coil, so that the two longitudinal stress waves travel to the wire in a push-pull manner and thereby set up a torsional stress wave in the delay line wire 2. Accordingly at least one of the coils is given a polarizing field, as by a permanent magnet 14 or by applying thereto a suitable biasing current, of opposite sense to the field set up by the pulse applied to the coil, so that the magnetostrictive contraction in the tape associated with the coil is reduced by the energizing pulse instead of increased. Accordingly since the same pulse is applied to the other coil so as to cause contraction of the other tape, longitudinal stress waves of opposite sense are set up in the two tapes and travel to the wire 2 in push-pull fashion, thereby setting up a torsional stress wave in the wire 2. If desired the other tape also may be polarized to utilize the most favorable part of its magnetic characteristic. This may be done by another permanent magnet 16 or biasing current, or by the same magnet 14 if the coils are connected so that the fields produced by the energizing pulses serve to increase the contraction in one tape and decrease it in the other tape.

The output transducer B is essentially the same as the input transducer, with permanent magnets employed to set up fields passing axially through its two coils. At the output transducer the arriving torsional wave sets up longitudinal stress waves in the two tapes thereof, and the combination of coils and magnets constitute electromagnetic means which respond electrically to such waves, the two coils being energized to develop an output pulse.

To the extent hereinabove described the delay line is conventional and well known, as demonstrated by U.S. Pat. No. 3,011,136 issued Nov. 28, 1961, to G. G. Scarrott for Electroacoustic Delay Line.

In accordance with this invention, one or the other of the transducers is provided with novel temperature compensating means. In the illustrated embodiment, the temperature compensating means is associated with the input transducer.

Figures 2, 4:
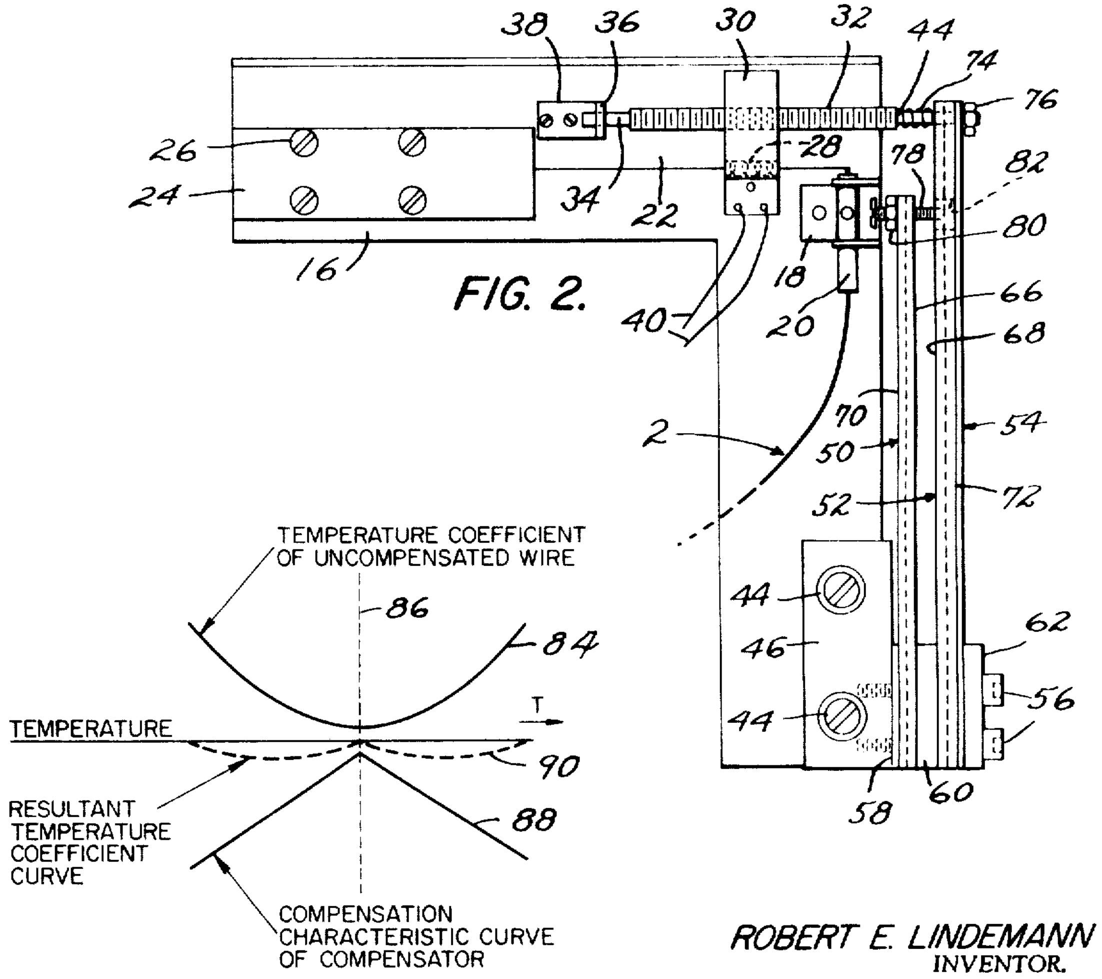
FIG. 2 is a plan view of the temperature compensating assembly employed in the delay line of FIG. 1.

Turning now to FIG. 2, a base plate 16 serves as a support means for the input transducer and the temperature compensating means. Supported by a bracket 18 attached to base plate 16 is a suitable holder 20 for the input end of the delay line. The delay line wire 2 projects through holder 20 so as to permit attachment thereto of the ends of two driver tapes 22. Although only one tape is shown in FIG. 2, it is to be understood that there are in fact two tapes, one located below the other and hence not visible in the plan view of FIG. 2. The two tapes terminate in a block 24 which is secured to the base plate by means of screws 26.

The two torsional driver tapes are excited by means of two transducer coils 28 (only one of which is visible in FIG. 2) which are carried by a holder 30 which is mounted on a screw or threaded shaft 32. Holder 30 is coupled to shaft 32 by means of internal threads and rests on base plate 16 so that it will move axially along the shaft but will not rotate as the shaft is turned. One unthreaded end 34 of shaft 32 extends through and is journaled in the upstanding portion 36 of an L-shaped bracket 38 which is fastened to base plate 16. The other end of shaft 32 is also unthreaded and has a reduced diameter so as to provide a shoulder 44. Input signals for energizing the coils are applied via leads 40 attached to terminals on holder 30 which are connected internally to the two coils.

Also attached to base plate 16 by means of screws 44 is a block 46 to which are attached some of the elements of the temperature compensating means. These elements include two resilient bimetallic arms identified generally at 50 and 52, and a third resilient arm 54, all secured at one end to the side of block 46 by means of screws 56. Arm 50 is spaced from block 46 and arm 52 by spacers 58 and 60. An additional plate 62 clamps the aforesaid end of arm 54 to arm 52. Arms 50 and 52 each consist of two layers (demarcated by dotted lines in FIG. 2) of different metallic composition, one layer having a relatively high and the other a relatively low thermal coefficient of expansion. Arm 50 is mounted so that its low expansion side or layer 66 faces the low expansion side or layer 68 of arm 52. The high expansion sides are identified by numerals 70 and 72. Arm 52 is longer than arm 50, extending far enough to be coupled to shaft 32. In this connection, it is to be noted that outer ends of arms 52 and 54 have aligned holes therein through which extends the shaft 32. A compression spring 74 is mounted on shaft 32 so that one end engages arm 52 and the other end abuts the shoulder 44. The extremity of shaft 32 is threaded to receive a nut 76 which prevents arm 52 from moving out of engagement with spring 74.

The outer or free end of arm 50 has a threaded hole in which is screwed a bolt 78. A lock nut 80 acts to prevent rotation of bolt 78 once it has been screwed to a given depth. Bolt 78 projects through arm 50 into a hole 82 provided in arm 52. At ambient, i.e. room, temperature the arms 50, 52 and 54 are all straight and the bolt 78 does not contact arm 54. At this same temperature the depth of shaft 32 relative to bearing block 36 is determined by the positions of arms 52 and 54, and the position of coil holder 30 (and hence the delay time) is determined by the position of shaft 32 and its position on the shaft. Initial adjustment of the position of the coil holder is effected by rotating shaft 32.

Referring now to FIG. 4, the curve 84 illustrates the temperature coefficient of the delay line wire 2. The apex of curve 84 is demarcated by the dotted line 86, and such apex is usually at room temperature, i.e. 20°—25° C., but may be at a higher or lower temperature according to the composition of the wire. The temperature compensating means described above effects movement of the coil holder with change in temperature, according to curve 88, with the result that the delay line has a resultant temperature coefficient curve as shown at 90. While curve 90 is not flat, it is sufficiently so as to minimize variation in delay time with temperature to within limits which render the delay line unit suitable for high accuracy applications. The invention reduces the error to about one-fifth of a part per million over a temperature range of 10° C. to 70° C.

The manner in which such compensation is accomplished can best be understood by the following explanation of the mode of operation of the temperature compensating assembly. With the delay line at room temperature, the threaded shaft 32 is rotated so as to position the input transducer coil holder 30 at a point along the driver tapes 22 which will provide the desired time delay. Once this vernier adjustment has been completed, the delay line is used in the usual manner, with input signals applied to transducer A via leads 40 generating acoustic signals in the delay line wire 2 which are sensed by the transducer B after a time delay determined by the acoustic spacing of the two transducers. Assume now that the ambient temperature to which the delay line is exposed starts to rise. The increase in temperature causes both arms 50 and 52 to bend toward each other. The bending of arm 50 causes the screw 78 to force arm 54 to bend to the right away from the delay line holder 20, and such movement of arm 54 causes the threaded shaft 32 and in turn the coil holder 30 to move to the right, thereby reducing the effective acoustic length of the driver tapes. The opposite movement of arm 52 is taken up by further compression of spring 74. If subsequently the temperature decreases, arm 50 will unbend and in so doing it will allow the resilient arm 54 to do the same, with the result that the shaft 32 and in turn the coil holder 30 will move to the left to increase the effective acoustic length of the driver tapes. If the temperature drops below room temperature, the arm 50 will start to bend in the other direction, i.e. to the left in FIG. 2, causing the screw 78 to move out of engagement with arm 54; simultaneously the arm 52 will commence to bend to the right, forcing shaft 32 to the right to again decrease the effective acoustic length of tapes 22. Should the temperature commence to increase again back to room temperature, the arm 52 (and also arm 50) will again straighten out and shaft 32 will move to the left to restore the coil holder 30 to its original position. Plotting the displacement of coil holder 30 and shaft 32 as a function of temperature yields a curve like curve 88. The result is that the temperature coefficient of the delay line is compensated so as to be essentially as represented by curve 90.

Although the invention has been described in connection with a helical delay line, it is to be appreciated that it is applicable to other wire delay lines. By way of example, it may be embodied in a straight wire delay line such as represented in FIG. 1 of U.S. Pat. No. 3,011,136. It also is obvious that the temperature compensating assembly may be associated with the output transducer rather than the input transducer and that additional transducers, with or without temperature compensation as herein described, may be connected to the delay line at intermediate points along the length thereof in order to provide different delay periods with the same line. Still other changes and modifications may be made without departing from the spirit of the invention.

What I claim is:

1. Acoustic delay line apparatus comprising a delay line capable of propagating stress waves, a first input transducer means coupled to said delay line for applying signals to be delayed to said line, a second output transducer coupled to said delay line for receiving signals delayed by said line, and means for adjusting the position of one of said transducers with respect to said line so as to vary the delay time of said signals, said last-mentioned means comprising (a) first and second bimetallic members each having two different temperature coefficients of expansion and each disposed so that they move in opposite direction when subjected to corresponding changes in temperature, and (b) coupling means coupling said first and second bimetallic members to said one transducer so that said bimetallic members are effective to adjust the position of said one transducer according to changes in temperature to temperature compensate the delay time of said signals traversing said line.

2. Acoustic delay line apparatus according to claim 1 wherein said first and second members are elongate arms and said coupling means is a shaft supporting said one transducer and moveable by one or the other of said arms in response to changes in temperature.

3. Acoustic delay line apparatus according to claim 9 wherein said arms are mounted in spaced side-by-side relation to each other.

4. Acoustic delay line apparatus according to claim 9 wherein the temperature versus temperature coefficient of delay characteristic is a substantially parabolic function and said predetermined reference temperature is a temperature at about which said parabolic function is minimal.

5. Acoustic delay line apparatus according to claim 4 wherein said delay line is a wire.

6. Acoustic delay line apparatus according to claim 2 wherein said shaft is rotatable, and further wherein said one transducer is supported so as to be moveable by rotation of said shaft whereby to provide a vernier adjustment of transducer position relative to said delay line.

7. Acoustic delay line apparatus according to claim 1 wherein said line is wound in a flat spiral.

8. Acoustic delay line apparatus according to claim 1 wherein said one transducer is said first input transducer.

9. Acoustic delay line apparatus comprising a delay line capable of propagating stress waves, a first input transducer means coupled to said delay line for applying signals to be delayed to said line, a second output transducer coupled to said delay line for receiving signals delayed by said line, and means for adjusting the position of one of said transducers with respect to said line so as to vary the delay time of said signals, said last-mentioned means comprising first and second elongate bimetallic arms each having two different temperature coefficients of expansion and coupling means coupling said first and second arms to said one transducer so that said bimetallic arms are effective to temperature compensate the delay time of said signals traversing said line, each of said arms being mounted in cantilever fashion so that one end thereof can shift with bending movement thereof produced by a change in temperature, said coupling means including a moveable shaft supporting said one transducer and extending through said first arm, means on said shaft for causing said shaft to move in response to bending of said first arm resulting from a temperature above a predetermined reference temperature, a third arm, said shaft extending through said third arm and moveable in response to bending of said third arm, and means on said second arm for bending said third arm in response to bending of said second arm resulting from a temperature below said predetermined reference temperature.